(12) United States Patent
Wu et al.

(10) Patent No.: US 10,816,349 B2
(45) Date of Patent: Oct. 27, 2020

(54) SYSTEMS AND METHODS FOR ROUTE PLANNING BASED ON DEEP CONVOLUTIONAL NEURAL NETWORK

(71) Applicant: BEIJING DIDI INFINITY TECHNOLOGY AND DEVELOPMENT CO., LTD., Beijing (CN)

(72) Inventors: Zhengwei Wu, Beijing (CN); Tao Hu, Beijing (CN); Zheng Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/705,333

(22) Filed: Dec. 6, 2019

(65) Prior Publication Data

US 2020/0109959 A1 Apr. 9, 2020

Related U.S. Application Data

(63) Continuation of application No. PCT/CN2017/088061, filed on Jun. 13, 2017.

(51) Int. Cl.
*G01C 21/34* (2006.01)
*G06N 3/04* (2006.01)
*G06N 3/08* (2006.01)

(52) U.S. Cl.
CPC ..... *G01C 21/3446* (2013.01); *G01C 21/3453* (2013.01); *G01C 21/3484* (2013.01);
(Continued)

(58) Field of Classification Search
CPC ............ G01C 21/3446; G01C 21/3453; G01C 21/3484; G01C 21/3492; G06N 3/04; G06N 3/08
See application file for complete search history.

(56) References Cited

U.S. PATENT DOCUMENTS

2010/0106603 A1 4/2010 Dey et al.
2016/0370192 A1 12/2016 Maischberger et al.
(Continued)

FOREIGN PATENT DOCUMENTS

CN 102278995 A 12/2011
CN 106225797 A 12/2016
(Continued)

OTHER PUBLICATIONS

International Search Report in PCT/CN2017/088061 dated Mar. 12, 2018, 5 pages.
(Continued)

*Primary Examiner* — Michael D Lang
(74) *Attorney, Agent, or Firm* — Metis IP LLC

(57) ABSTRACT

The preset application discloses a method for route planning. At least one device including at least one processor and a storage may implement the method. The method may include one or more of the following operations. The device may first obtain a start location and a destination, road characteristic information and a plurality of historical routes. The device may then train a model based on the plurality of historical routes. Then the device may run the trained model to sequentially determine a plurality of road intersections between the start location and the destination, and a target entrance and target exit that corresponding to each of the plurality of the road intersections based on characteristic information. Finally, the device may generate a recom-
(Continued)

mended route from the start location to the based on the target entrances and target exits.

18 Claims, 14 Drawing Sheets

(52) U.S. Cl.
CPC .......... *G01C 21/3492* (2013.01); *G06N 3/04* (2013.01); *G06N 3/08* (2013.01)

(56) References Cited

U.S. PATENT DOCUMENTS

| | | |
|---|---|---|
| 2016/0379092 A1 | 12/2016 | Kutliroff |
| 2018/0061230 A1* | 3/2018 | Madigan .............. G08G 1/0965 |

FOREIGN PATENT DOCUMENTS

| | | |
|---|---|---|
| CN | 106500713 A | 3/2017 |
| CN | 106548645 A | 3/2017 |

OTHER PUBLICATIONS

Written Opinion in PCT/CN2017/088061 dated Mar. 12, 2018, 4 pages.
Convolutional Neural Networks (CNNs ConvNets), 2016.

\* cited by examiner

SYSTEMS AND METHODS FOR ROUTE PLANNING BASED ON DEEP CONVOLUTIONAL NEURAL NETWORK

CROSS-REFERENCE TO RELATED APPLICATION

This application is a continuation of International Application No. PCT/CN2017/088061, filed on Jun. 13, 2017, the entire contents of which are hereby incorporated by reference.

TECHNICAL FIELD

The present disclosure generally relates to systems and methods for route planning, and particularly, to systems and methods for route planning based on a deep convolutional neural network.

BACKGROUND

Map-based digital navigation has become increasingly popular. Current map-based navigation application generally recommends a route for a user from his or her start location to a destination. However, the recommended route is generated only based on a road map and certain predetermined factors and rules (e.g., time to be consumed, route length, traffic condition, etc.), and thus can be inapplicable in real-life scenarios without the consideration of user characteristics and preferences.

SUMMARY

In one aspect of the present disclosure, a system is provided. The system may include at least one storage medium including a set of instructions for route planning, and at least one processor in communication with the at least one storage medium. The at least one processor may execute the set of instructions. The at least one processor may receive first electronic signals encoding a start location and a destination. The at least one processor may operate logic circuits in the at least one processor to execute a model to sequentially determine a series of road intersections under a sequence. The at least one processor may operate the logic circuits in the at least one processor to execute the model to sequentially determine a target entrance and a target exit of each road intersection of the series of road intersections, and a recommended route from the start location to the destination based on the target entrances and target exits of the series of road intersections.

In another aspect of the present disclosure, a method is provided. At least one device including at least one processor and a storage may implement the method. The method may include one or more of the following operations. The device may receive first electronic signals encoding a start location and a destination. The device may operate logic circuits in the at least one processor to execute a model to sequentially determine a series of road intersections under a sequence. The device may operate the logic circuits in the at least one processor to execute the model to sequentially determine a target entrance and a target exit of each road intersection of the series of road intersections, and a recommended route from the start location to the destination based on the target entrances and target exits of the series of road intersections.

In another aspect of the present disclosure, a non-transitory computer medium that includes instructions is provided. When an electronic device executed the non-transitory computer readable medium, the instructions may cause at least one processor of the electronic device to perform one or more of the following operations. The at least one processor may receive first electronic signals encoding a start location and a destination. The at least one processor may operate logic circuits in the at least one processor to execute a model to sequentially determine a series of road intersections under a sequence. The at least one processor may operate the logic circuits in the at least one processor to execute the model to sequentially determine a target entrance and a target exit of each road intersection of the series of road intersections, and a recommended route from the start location to the destination based on the target entrances and target exits of the series of road intersections.

In some embodiments, the at least one processor may determine the recommended route by connecting the start location and the destination through the target entrance and the target exit of each road intersection of the series of road intersections under the sequence.

In some embodiments, the model may include at least one of a convolutional layer, a Rectified Linear Unit (ReLU) layer, a fully connected layer or a pooling layer.

In some embodiments, the first electronic signals may encode a road map including the start location and the destination. The first electronic signals may also encode road characteristic information associated with roads in the road map. The first electronic signals may further encode structured data encoding a plurality of historical routes. The at least one processor may train the model based on the plurality of historical routes. The at least one processor may further generate the recommended route from the start location to the destination based on the model and the road characteristic information.

In some embodiments, the road characteristic information may include information of at least one of road grades, road lengths, road width, curve radius, speed limit, traffic restriction, traffic lights, traffic accident, or traffic congestion.

In some embodiments, the model may include at least one of a convolutional neural network (CNN), a road map including a three-channel RGB map as an input of the CNN, or road characteristic information including additional channels of map layers as an input of the CNN.

In some embodiments, the first electronic signals may include selecting a plurality of target routes from the plurality of historical routes. The first electronic signals may include generating the route from the start location to the destination based on the road characteristic information and the plurality of target routes.

In some embodiments, a start location or a destination of each of the plurality of target routes may be the same as or similar to the start location or the destination encoded in the first electronic signals.

In some embodiments, the selection of the plurality of target routes may include one or more following operations. The at least one processor may determine the quality of each of the plurality of historical routes. The at least one processor may select some of the plurality of historical routes as the target routes based on the quality of the plurality of historical routes.

In some embodiments, the device may determine the quality of each of the plurality of historical routes based on at least one of distance, Estimated Time of Arrival (ETA), degree of safeness, traffic conditions, road types, or sceneries along the route.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
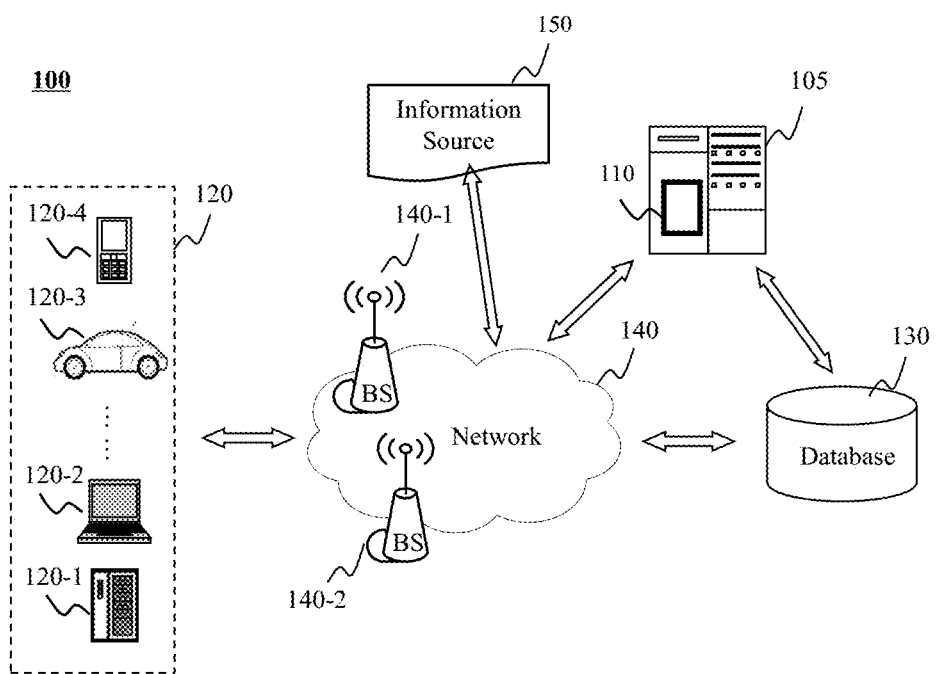
FIG. 1 is a block diagram of an exemplary route planning system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated characteristics, integers, steps, operations, elements, and/or components, but do not preclude the presence or addition of one or more other characteristics, integers, steps, operations, elements, components, and/or groups thereof.

These and other characteristics, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express.

The application scenarios of different embodiments of the present disclosure may include but not limited to one or more webpages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar server.

The term "passenger," "requester," "requestor," "service requester," "service requestor" and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for route planning for an online on-demand transportation system using a neural network model. The neural network model may include a convolutional layer, a Rectified Linear Unit (ReLU) layer, a fully connected layer and a pooling layer. Further, the neural network model may be trained using a three-channel RGB map layer and several additional channels of map layers to describe road characteristic information such as road grades, road lengths, road width, curve radius, speed limit, traffic restriction, traffic lights, traffic accident, and traffic congestion. To provide a recommended route, the systems may receive a start location and a destination, and then run the neural network model to determine an optimized route by conducting a Markov decision process. As a result, the systems may sequentially determine a series of road intersections. Each road intersection includes an entrance connecting to a road link for entering the road intersection and an exit connecting to another road link for exiting the road intersection. The recommended route may be the road links that are connected by the series of the road intersections under that sequence.

It should be noted that route planning for a user of an online on-demand transportation service, such as route planning for an online taxi hailing service, is a new form of service rooted only in post-Internet era. It provides technical solutions to users and service providers that could raise only in post-Internet era.

FIG. 1 is a block diagram of an exemplary route planning system according to some embodiments of the present disclosure. The route planning system 100 may be an online platform including a server 105, a terminal 120, a database 130 and a network 140. In some embodiments, the server 105 may be a single server, or a server group. The server group may be centralized, or distributed (e.g., server 105 may be a distributed system). In some embodiments, the server 105 may be local or remote. For example, the server 105 may access information and/or data stored in the terminal 120, and/or the database 130 via the network 140. As another example, the server 105 may be directly connected to the terminal 120, and/or the database 130 to access stored information and/or data. In some embodiments, the server 105 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 105 may be implemented on a computing device 200 having one or more components illustrated in FIG. 2 in the present disclosure.

In some embodiments, the server 105 may include a processing engine 110. The processing engine 110 may process information and/or data relating to the service request to perform one or more functions described in the present disclosure. For example, the processing engine 110 may collect information of a plurality of historical routes, and determine a currently recommended route from the start location to the destination. In some embodiments, the processing engine 110 may include one or more processing engines (e.g., single-core processing engine(s) or multi-core processor(s)). Merely by way of example, the processing engine 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Network 140 may be a single network or a combination of networks. For example, the network 140 may include a local area network (LAN), a wide area network (WAN), a public network, a private network, a proprietary network, a public switched telephone network (PSTN), the Internet, a wireless network, a virtual network, or any combination thereof. Network 140 may include multiple network access points, such as a wired or wireless access point, including a base station 120-1, a base station 120-2, a network switch point (not shown), etc. Through the network access points, any data source may be connected to network 140 and transmit information via network 140. Network 140 may also include a wireless network (e.g., Bluetooth® network, wireless local area network (WLAN), and/or Wi-Fi), mobile networks (e.g., 2G, 3G, or 4G signals), or other communication methods (e.g., virtual private network, (VPN), shared network, near field communication (NFC), and/or Zig-Bee®).

In some embodiments, the user of the terminal 120 may be a service requester or a service provider. In some embodiments, a service provider may be a user of the terminal 120.

A plurality of historical routes may be obtained from database 130 or the information source 150. The information source 150 may be a source configured to provide other information for the server 105. The information source 150 may provide the server 105 with service information, such as weather conditions, traffic information, information of laws and regulations, news events, life information, life guide information, or the like. The information source 150 may exist in the form of a single central server, multiple servers connected via the network, multiple personal devices, etc. When the information source 150 is implemented using multiple personal devices, the personal devices can generate content (e.g., as referred to as the "user-generated content"), for example, by uploading text, voice, image and video to a cloud server. An information source may be generated by the multiple personal devices and the cloud server.

Taking transportation service as an example, the information source 150 may include a municipal service system containing map information and city service information, a real-time traffic broadcasting system, a weather broadcasting system, a news network, or the like. The information source 150 may be physical device, such as a common speed measuring device, a sensor, or an IOT (Internet of Things) device, including a vehicle speedometer, a radar speedometer, a temperature and humidity sensor, etc. The information source 150 may be a source configured to obtain news, messages, real-time road information, or the like. For example, the information source 150 may be a network information source that includes an Internet news group based on Usenet, a server over the Internet, a weather information server, a road condition information server, or the like, or any combination thereof. Taking food delivery service as an example, the information source 150 may be a system storing information of multiple food providers in a particular region, a municipal service system containing map information and city service information, a real-time traffic broadcasting system, a weather broadcasting system, a news network, or the like. The examples described herein are not intended to limit the scope of the information source or the type of services provided by the information source. Any device or network that can provide information of the services may be designated as an information source in the present application.

The server 105 may obtain data based on historical routes to train the route recommendation model. In some embodiments, the terminal 120 may receive a start location and a destination from a user. The terminal 120 may transmit via network 140 the received start location and destination to the server 105. The server 105 may then determine a recommended route from the start location to the destination using a trained route recommendation model as described elsewhere in this disclosure. The server 105 may further transmit via network 140 the determined recommended route to the terminal 120, which may then output (e.g., via its user interface) the recommended route to the user.

In some embodiments, the terminal 120 may include a mobile device 120-1, a tablet computer 120-2, a laptop computer 120-3, a built-in device in a motor vehicle 120-4, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the terminal 120 may be a device with positioning functions for locating the position of the user. In some embodiments, the terminal 120 may send positioning information to the server 105. The terminal 120 may correspond to the mobile device 300.

The database 130 may store data and/or instructions. In some embodiments, the database 130 may store data obtained from the terminal 120. In some embodiments, the database 130 may store data and/or instructions that the server 105 may execute or use to perform exemplary methods described in the present disclosure. In some embodiments, database 130 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 130 may be connected to the network 140 to communicate with one or more components in the route planning system 100 (e.g., the server 105, the terminal 120, etc.). One or more components in the network environment 100 may access the data or instructions stored in the database 130 via the network 140. In some embodiments, the database 130 may be directly connected to or communicate with one or more components in the route planning system 100 (e.g., the server 105, the terminal 120, etc.). In some embodiments, the database 130 may be part of the server 105.

In some embodiments, one or more components in the route planning system 100 (e.g., the server 105, the terminal 120, etc.) may have a permission to access the database 130. In some embodiments, one or more components in the route planning system 100 may read and/or modify information relating to the requester, provider, and/or the public when one or more conditions are met. For example, the server 105 may read and/or modify one or more users' information after a service.

In some embodiments, information exchanging of one or more components in the route planning system 100 may be achieved by way of requesting a service. The object of the service request may be any product. In some embodiments, the product may be a tangible product, or an intangible product. The tangible product may include food, medicine, commodity, chemical product, electrical appliance, clothing, car, housing, luxury, or the like, or any combination thereof. The intangible product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be implemented as a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
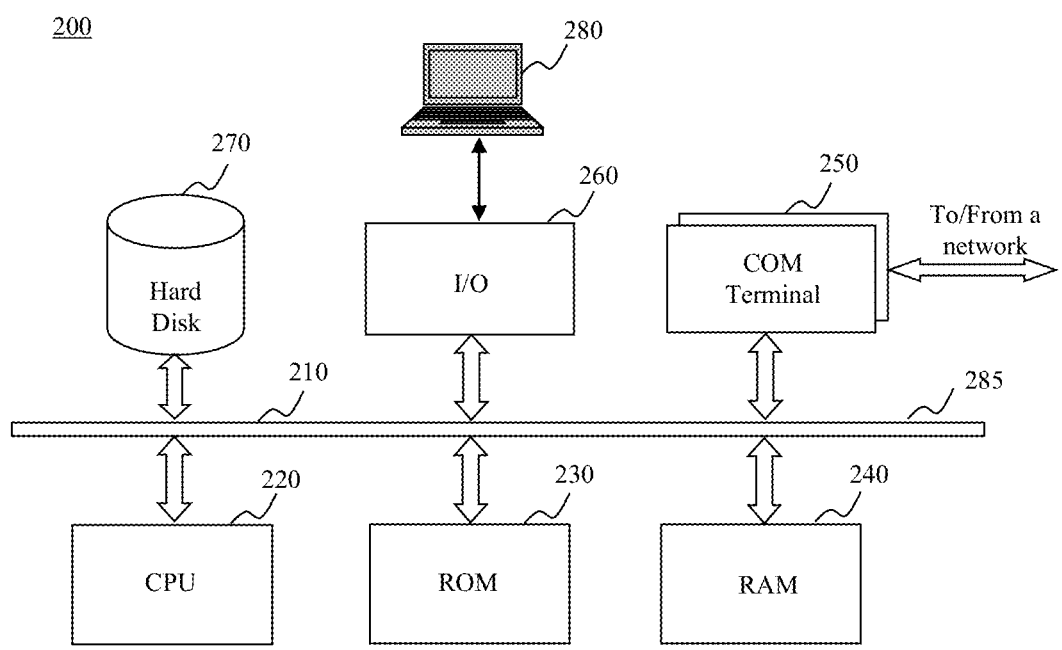
FIG. 2 illustrates a schematic diagram of an exemplary computing device according to some embodiments of the present disclosure.

FIG. 2 illustrates a schematic diagram of an exemplary computing device according to some embodiments of the present disclosure. The computing device may be a computer, such as the server 105 in FIG. 1 and/or a computer with specific functions, configured to implement any particular system according to some embodiments of the present disclosure. Computing device 200 may be configured to implement any components that perform one or more functions disclosed in the present disclosure. For example, server 105 may be implemented in hardware devices, software programs, firmware, or any combination thereof of a computer like computing device 200. For brevity, FIG. 2 depicts only one computing device. In some embodiments, the functions of the computing device, providing function that route planning may require, may be implemented by a group of similar platforms in a distributed mode to disperse the processing load of the system.

Computing device 200 may include a communication terminal 250 that may connect with a network that may implement the data communication. Computing device 200 may also include a processor 220 that is configured to execute instructions and includes one or more processors. The schematic computer platform may include an internal communication bus 285, different types of program storage units and data storage units (e.g., a hard disk 270, a read-only memory (ROM) 230, a random-access memory (RAM) 240), various data files applicable to computer processing and/or communication, and some program instructions executed possibly by the processor 220. Computing device 200 may also include an I/O device 260 that may support the input and output of data flows between computing device 200 and other components. Moreover, computing device 200 may receive programs and data via the communication network.

Figure 3:
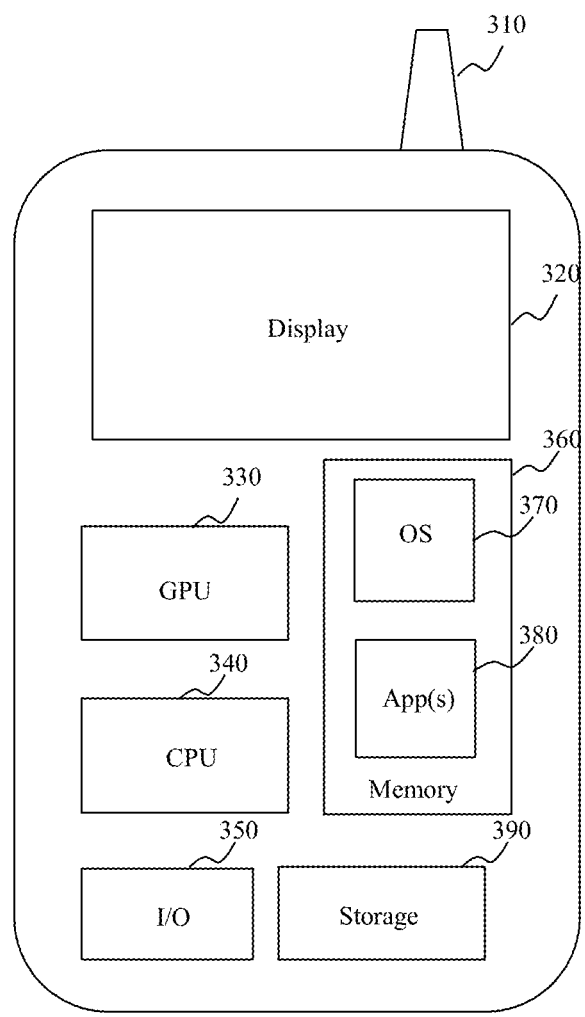
FIG. 3 is a schematic diagram illustrating exemplary hardware and/or software components of an exemplary mobile device 300 according to embodiments of the present disclosure.

FIG. 3 is a schematic diagram illustrating exemplary hardware and/or software components of an exemplary mobile device 300 on which the route planning system 100 of connectable devices may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, a storage 390. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the route planning system 100. User interactions with the information stream may be achieved via the I/O 350 and provided to the database 130, the server 105 and/or other components of the route planning system 100. In some embodiments, the mobile device 300 may be an exemplary embodiment corresponding to the terminal 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
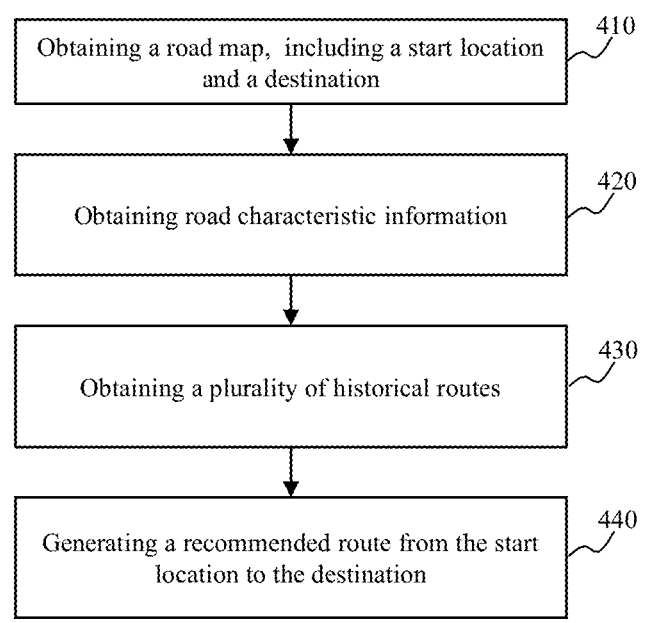
FIG. 4 is a flowchart illustrating an exemplary process for performing a route planning according to some embodiments of the present disclosure.

One of ordinary skill in the art would understand that when an element of the route planning system 100 performs, the element may perform through electrical signals and/or electromagnetic signals. For example, when a service requestor terminal 120 processes a task, such as making a determination, identifying or selecting an object, the requestor terminal 120 may operate logic circuits in its processor to process such task. When the service requestor terminal 120 sends out a service request to the server 105, a processor of the service requestor terminal 120 may generate electrical signals encoding the request. The processor of the service requestor terminal 120 may then send the electrical signals to an output port. If the service requestor terminal 120 communicates with the server 105 via a wired network, the output port may be physically connected to a cable, which further transmit the electrical signal to an input port of the server 105. If the service requestor terminal 120 communicates with the server 105 via a wireless network, the output port of the service requestor terminal 120 may be one or more antennas, which convert the electrical signal to electromagnetic signal. Similarly, a service provider terminal 120 may process a task through operation of logic circuits in its processor, and receive an instruction and/or service request from the server 105 via electrical signal or electromagnet signals. Within an electronic device, such as the service requestor terminal 120, the service provider terminal 140, and/or the server 105, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals FIG. 4 is a flowchart illustrating an exemplary process for route planning according to some embodiments of the present disclosure. The process and/or method 400 may be executed by a device in the route planning system 100. For example, the process and/or method 400 may be implemented as a set of instructions (e.g., an application) stored in a storage medium. At least part of process 400 may be performed by computing device 200 shown in FIG. 2. In some embodiments, at least part of process 400 may also be performed by the mobile device 300 shown in FIG. 3.

In 410, the device may obtain a road map. The road map may be displayed on a screen (e.g. display 320 of the mobile device). In some embodiments, only a specific area of the road map may be displayed on the screen. A user may adjust the displayed area the road map by touching the screen, dragging the road map, touching the side buttons, etc. In some embodiments, a start location and a destination may be obtained. More specifically, the start location and the destination may be obtained by a terminal itself, or may be obtained by a server of the network environment 100 and/or the another terminal, and then sent to the terminal by the server. The start location and the destination may relate to a current or a future service request. For example, in a car hailing service, a user (e.g. a driver or a passenger) may provide a start location and a destination and a road map including the start location and the destination may be generated and displayed. In some embodiments, the start location may be obtained by the terminal 120 and the user are not required to provide it. In some embodiments, there may be multiple types of roads between the start location and the destination. The types of roads may include highway, parkway, beltway, speedway, street, avenue, byway, alley, lane, or the like, or a combination thereof.

In 420, the device may obtain road characteristic information. The road characteristic information may include static, real-time, and/or substantially real-time characteristic information. The static characteristic information may include information about locations and numbers of traffic lights, road characteristic (e.g. one-way or two-way), speed limits, traffic restrictions, etc. The real-time and/or substantially real-time characteristic information may include information about traffic flow, traffic accident, traffic congestion, etc. In some embodiments, the road characteristic information may be obtained from the database 130 or the information source 150.

In 430, the device may obtain a plurality of historical routes. In some embodiments, the historical routes may be recorded by one or more online transportation platforms. The historical routes may be obtained based on routes of the user him/her self or others over a certain period. The historical routes may be obtained from, for example, terminal 120, or database 130. The device may train a model based on the plurality of historical routes. By inputting a start location and a destination (and other information if needed), a trained model may generate a route from the start location to the destination. Merely by way of example, the model may include a convolutional neural network (CNN), a deep belief network (DBN), a Stacked Auto-Encoders (SAE), a logistic regression (LR) model, a support vector machine (SVM), a decision tree model, a Naive Bayesian Model, a random forest model, or a Restricted Boltzmann Machine (RBM), a Q-learning Model, or the like, or a combination thereof. In some embodiments, the plurality of historical routes relevant to the training processes may have different start locations, destinations, road types, environments, etc. By training with these historical routes, a general purposed model may be generated. The general purposed model may generate a route with reasonable quality corresponding to the inputs of different start locations and destinations. In some other embodiments, the historical routes relevant to the training processes may be those that have a same or similar start location and/or destination as the current service request. In this case, a specific purposed model may be generated. With respect to the current service request, the specific purposed model may have a faster responding speed (e.g. generate the recommended route faster) than the general purposed model. The quality of routes generated by the specific purposed model may also be better than the general purposed model with respect to the current service request. In some embodiments, the model (e.g., the specific purposed model or the general purposed model) may train themselves (also called self-learning) by the routes they generated so that they may generate similar routes faster.

In 440, the device may generate a route from the start location to the destination. As described elsewhere in the present disclosure, a model may be trained based on the plurality of historical routes (obtained in 430). In 440, the device may input a start location, a destination, and characteristic information to the trained model and the trained model may generate a route between the start location and the destination. In some embodiments, the model may generate multiple routes between the start location and the destination. The user and/or the route planning system 100 may select one of the multiple routes based on one or more route conditions. The route conditions may include distance, Estimated Time of Arrival (ETA), degree of safeness, traffic conditions, road types, sceneries along the route, etc. The detailed description regarding the training and using of the model may be found elsewhere in the present disclosure. See, e.g., FIG. 7 and the descriptions thereof.

Figure 5:
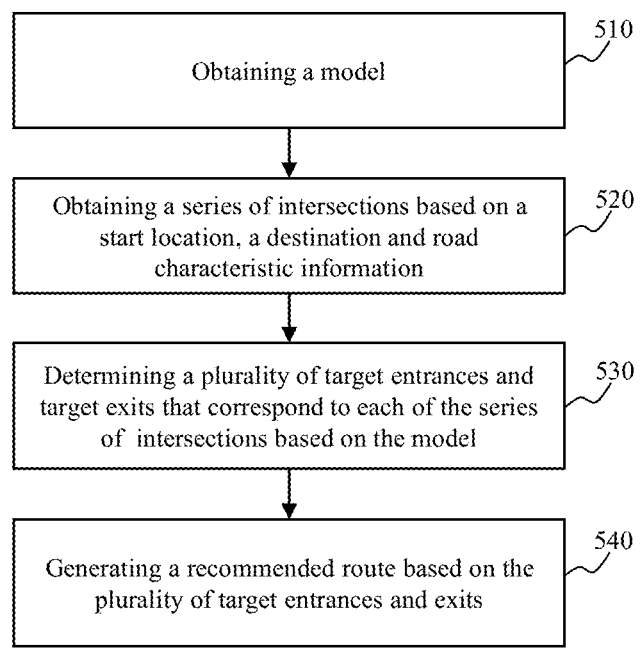
FIG. 5 is a flowchart illustrating an exemplary process for performing a route planning according to some embodiments of the present disclosure.

FIG. 5 is a flow chart illustrating an exemplary process for route planning according to some embodiments of the present disclosure. The process and/or method 500 may be executed by a device in the route planning system 100. Process 500 may be an exemplary embodiment of process 440 with reference to FIG. 4. In some embodiments, at least part of process 500 may be performed by computing device 200 shown in FIG. 2. In some embodiments, at least part of process 500 may be performed by the mobile device 300 shown in FIG. 3.

In 510, the device may obtain a model. Merely by way of example, the model may include convolutional neural network (CNN), deep belief network (DBN), Stacked Auto-Encoders (SAE), logistic regression (LR) model, support vector machine (SVM), decision tree model, Naive Bayesian Model, random forest model, Restricted Boltzmann Machine (RBM), or Q-learning Model, or the like, or a combination thereof. The detailed description regarding the training and using of the model may be found elsewhere in the present disclosure. See, e.g., FIG. 7 and the descriptions thereof. The detailed description regarding the structure of the model may be found elsewhere in the present disclosure. See, e.g., FIG. 14 and the descriptions thereof.

The model may be trained based on a plurality of historical routes. The plurality of historical routes may be classified into different qualities, e.g., a high quality, a medium quality, and a low quality. A route with high quality may have one or more of the following properties: shortest distance, least time, and smallest number of traffic lights, etc. A route with low quality may include an illegal driving (e.g., driving in a direction not allowed by traffic regulations, etc.) or deliberately take too many detours. A route with medium quality may be a legal but time consuming route. For example, the route with medium quality may have a high chance of traffic accidents or traffic congestions.

In some embodiments, the plurality of historical routes in different qualities may affect the model's generation of a recommend route. For example, if the model is trained by routes with high quality, the trained model may generate and recommend routes that are also in high quality (e.g., a "shortest" route, a "fastest" route, a free route). If a model is trained by routes with low quality, the trained model may generate and recommend routes that are also in low quality (e.g., long distance, time consuming, risky, etc.)

Therefore, in some embodiments, the route with low quality and/or medium quality may be filtered out from the plurality of historical routes based on multiple filtering parameters, e.g., distance, time, number of traffic lights etc. For example, a route that is obviously longer than other routes with same start location and destination may be filtered out as noise data. In some embodiments, the noise data may be found based on searching abnormal concentration data from observed value data and mean value data. In some embodiments, the noise data may be found based on a cluster analysis which gathers similar value data. In some embodiments, the route with high quality (also referred to as target routes) may be generated after filtering the routes with low or medium quality (or noise data).

In 520, the device may obtain a series of road intersections based on a start location, a destination and road characteristic information. In some embodiments, the device may obtain a series of intersections between the start location and the destination. The series of road intersections may be generated by the server 105. In some embodiments, there may be a plurality of roads between the start location and the destination, and the series of road intersections may refer to intersections of two or more of the roads. For example, a road intersection may be a three approaches intersection (e.g., a T intersection, a skewed T intersection, or a Y intersection), a four approaches intersection (e.g., a right angles, an offset, or an oblique intersection), or a five or more approaches intersection (e.g., a five-leg or a six-leg intersection), a roundabout intersection, or any other types of road intersections. In some embodiments, the road intersections may each have multiple turnings in various directions (e.g. left, right, forwards, etc.). Each of the turnings may be classified into entrances or exits depending on whether the user is entering or leaving the road intersection corresponding to the turning. In some embodiments, the road intersections may be determined in sequence or at once. For example, a first road intersection may be determined firstly, then a second road intersection may be determined based on the first road intersection, and so on.

In 530, the device may operate the model to determine a plurality of entrances and exits that correspond to each of the plurality of the road intersections. The entrance may be an end of a road segment and the exit may be a start of another road segment. In the present disclosure, a road segment may be defined as a section of road between two adjacent road intersections. In some embodiments, the entrances and the exits may correspond to one or more directions (e.g. left, right, forward) of the road intersections. For each of the plurality of road intersections, there may exist multiple entrances and exits in multiple directions. In some embodiments, a target entrance may be selected from the multiple entrances in multiple directions and a target exit may be selected from the multiple exits in multiple directions. In some embodiments, the trained model may performed the selections of the target exit and the target entrance based on road characteristic information. The road characteristic information may include road grades, road lengths, road width, curve radius, speed limit, traffic restriction, traffic lights, traffic accident, traffic congestion, or the like, or a combination thereof. In some embodiments, the device may obtain a sequence of the series of the road intersections. The sequence of the series of the road intersections may be obtained after all the target entrances and the target exits are obtained.

In 540, the device may determine and/or generate a recommended route based on the plurality of the entrances and exits. In some embodiments, a target entrance and a target exit are generated with respect to each of the plurality of intersections. In some embodiments, the recommended route may be generated by connecting the start location and the destination through the target entrance and the target exit of each road intersection of the series of road intersections under the sequence. For example, a target exit of a first intersection may be connected to a target entrance of a second intersection through the road segment (e.g. road link) there between. The similar process may be repeated to generate the recommended route from the start location to the destination. The detailed description regarding the generation of the recommended route based on the target entrances and the target exits of road intersections may be found elsewhere in the present disclosure. See, e.g., FIG. 6 and the descriptions thereof.

Figure 6:
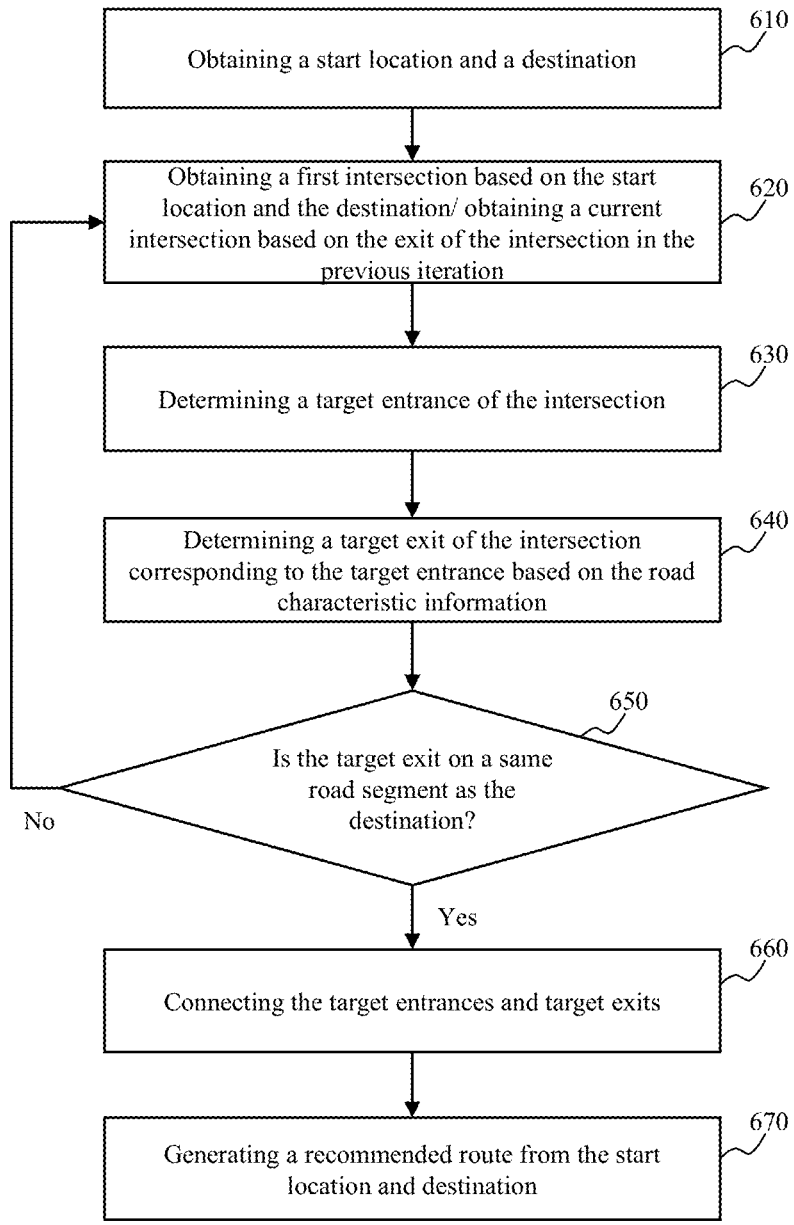
FIG. 6 is a flowchart illustrating an exemplary process for performing a route planning according to some embodiments of the present disclosure.

FIG. 6 is a flowchart illustrating an exemplary process for route planning according to some embodiments of the present disclosure. The process and/or method 600 may be executed by a device in the route planning system 100. Process 600 may be an exemplary embodiment of process 400 and/or with reference to FIG. 4 and/or FIG. 5. In some embodiments, at least part of process 600 may be performed by computing device 200 shown in FIG. 2. In some embodiments, at least part of process 600 may be performed by the mobile device 300 shown in FIG. 3.

In 610, the device may obtain a start location and a destination of a service request. In some embodiment, the device may be a server of an online on-demand transportation platform, and may receive the start location and the destination from a user (e.g., a driver) of the online on-demand transportation platform. In some embodiments, the device may be a user device, and the start location and the destination may be determined by the device based on a positioning technology (e.g., global positioning system (GPS) technology, a global navigation satellite system (GLONASS), a compass navigation system (COMPASS), a Galileo positioning system, a quasi-zenith satellite system (QZSS), a wireless fidelity (Wi-Fi) positioning technology) and/or input by a user. In some embodiments, the start location and the destination may be determined by the terminal 120. In some embodiments, the start location and the destination may refer to a location in a road segment or a road intersection.

In 620-650, the device may conduct a plurality iterations of determination. In each iteration, the device may determine a road intersection and/or an entrance and/or exit of the road intersection that gains the best output value (also referred to as target entrance and/or target exit) depending on the definition of the model.

In the first iteration, the device may determine a first road intersection in 620. The first road intersection may be a road intersection that is closest to the start location. In the subsequent iterations, a road intersection in current iteration (also referred to as a current road intersection) may be determined based on an exit of the road intersection in the previous iteration (also referred to as a previous road intersection). For example, a road segment may connect two road intersections. By following a road segment from an exit of the previous road intersection, a current road intersection may be reached.

In 630, the device may obtain an entrance of the road intersection in the same iteration as step 620. The entrance may be an end of a previous road segment.

In 640, the device may use the model to determine an exit of the road intersection correspond to the entrance. The exit (e.g. a turning of a direction) may be selected by the model based on the road characteristic information. The road characteristic information may include road grades, road lengths, road width, curve radius, speed limit, traffic restriction, traffic lights, traffic accident, traffic congestion, or the like, or a combination thereof. The detailed description regarding the structure of the model may be found elsewhere in the present disclosure. See, e.g., FIG. 14 and the descriptions thereof.

In some embodiments, the road intersection may include multiple exits corresponding to the entrance and each of the multiple exits may be valued. The exit with the highest value may be selected. In some embodiments, the exit is determined based on road characteristic information. For example, an exit that is connected to road segment(s) with fewer traffic lights may be selected. For another example, an exit that connects to a short cut may be selected.

In 650, the device may determine whether the exit is close to the destination. If the exit is close to the destination, then the process may proceed to 660. The "close" may refer to that the exit is in the same road segment as the destination. If the exit is not close to the destination, the process may proceed to 620 and the entrances and the exits in the next iteration may be obtained. The determination may be made by the model and/or the user.

In 660, the device may connect the plurality of entrances and exits. The plurality of entrances and exits may be connected in sequence (e.g. the start location connects to an entrance of the first road intersection and an exit of the first road intersection connects to the entrance of the second road intersection, and so on). In 670, the device may generate a route from the start location to the destination based on the connection. In some embodiments, process 600 may be repeated to generate multiple routes and the user and/or the device may select a route from the routes. The detailed description regarding the connection of the plurality of target entrances and target exits may be found elsewhere in the present disclosure. See, e.g., FIG. 8 and the descriptions thereof.

Figure 7:
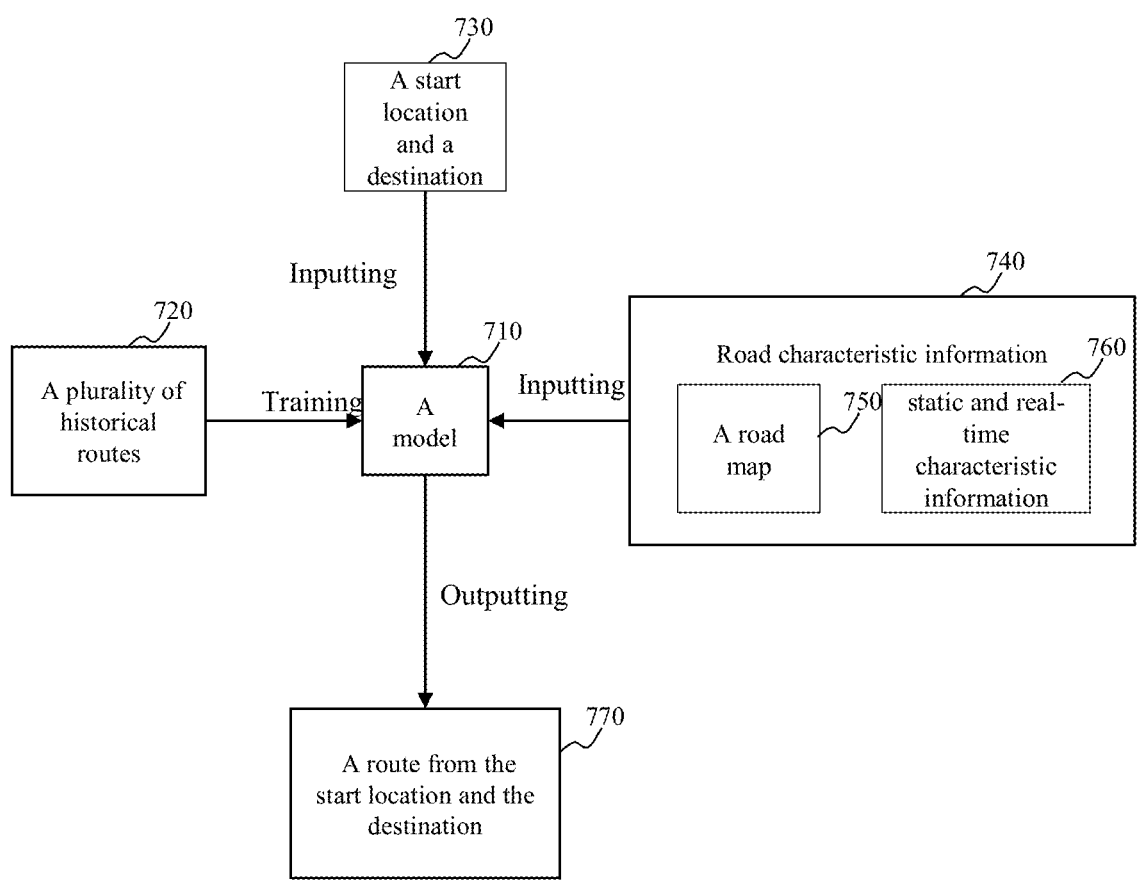
FIG. 7 illustrates a schematic diagram of training and using a model according to some embodiments of the present disclosure.

FIG. 7 illustrates a schematic diagram of training and using a model according to some embodiments of the present disclosure. A model 710 may be obtained by step 510 in process 500. Merely by way of example, the model may include convolutional neural network (CNN), deep belief network (DBN), Stacked Auto-Encoders (SAE), logistic regression (LR) model, support vector machine (SVM), decision tree model, Naive Bayesian Model, random forest model, or Restricted Boltzmann Machine (RBM), Q-learning Model, or the like, or a combination thereof. The model may be trained based on a plurality of historical routes 720 to obtain habits or preference of the current user and other users in choosing a route. A start location, a destination 730 and road characteristic information 740 may be input to the trained model and the trained model may output a route from the start location to the destination 770. The road characteristic information may include a road map 750, a static and real-time (and/or substantially real-time) characteristic information 760. The road map 750 may include one or more road characteristics such as start and end of the road, road length, road width, road grads (highway, parkway, beltway, speedway, street, avenue, etc.), etc. The static characteristic information may include traffic light, one-way or two-way, speed limit, traffic restriction, etc. The real-time characteristic information may include traffic flow, traffic accident, traffic congestion, forecasting traffic condition, etc. The static and real-time characteristic information may be obtained by information source 150. The detailed description regarding the structure of the model may be found elsewhere in the present disclosure. See, e.g., FIG. 14 and the descriptions thereof.

Figure 8:
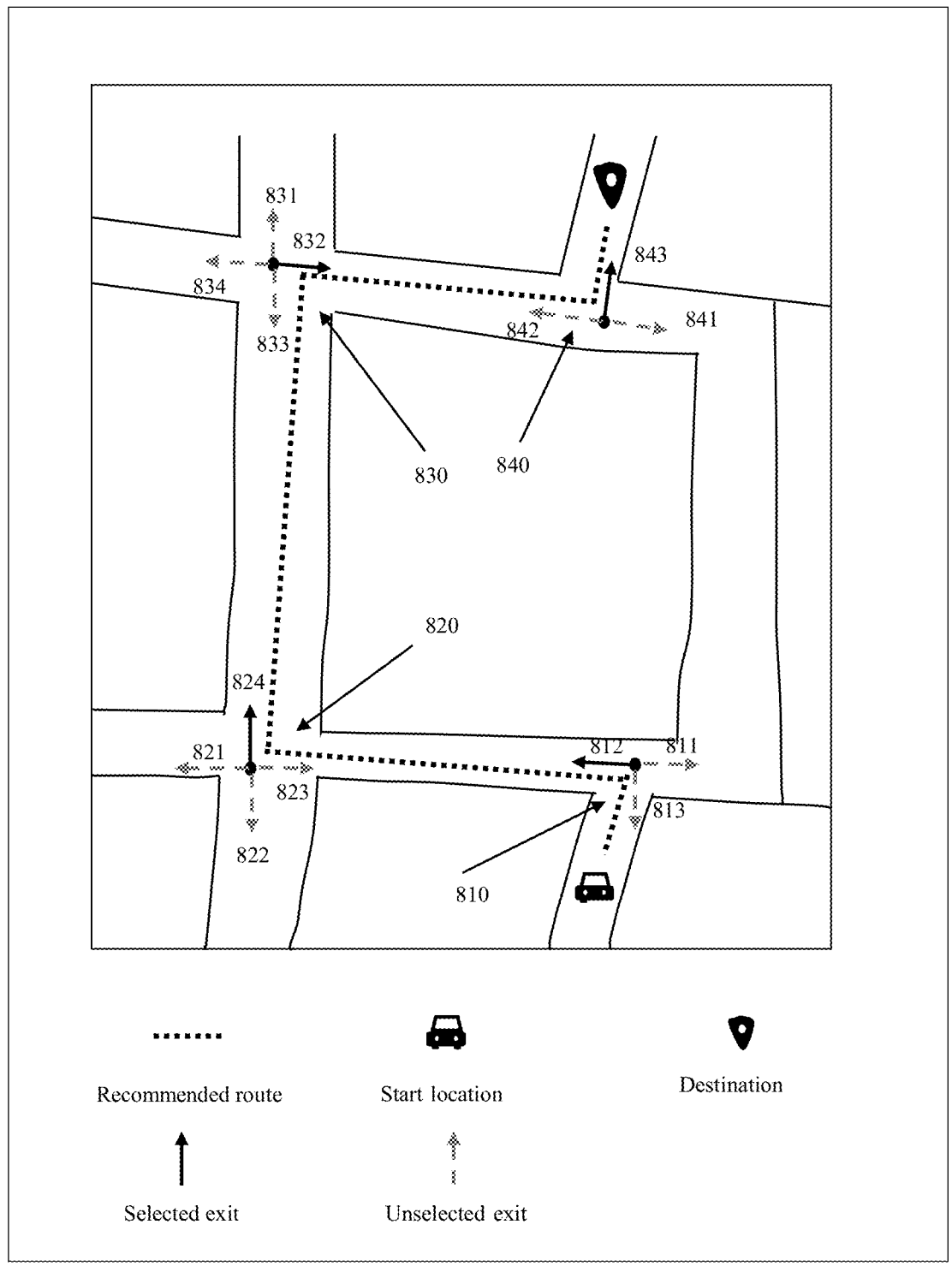
FIG. 8 illustrates a schematic diagram of designating an exit according to some embodiments of the present disclosure

FIG. 8 is a schematic diagram illustrating an exemplary process of route planning according to some embodiments of the present disclosure. In some embodiments, a user may drive to a road intersection which includes a plurality of entrances and exits, each of which may have a certain direction (e.g., left, right, forward, backward, etc.).

As shown in FIG. 8, road intersection 810, road intersection 820, road intersection 830, and the road intersection 840 are the road intersections between a start location and a destination. The plurality of road intersections may be obtained in process 520 shown in FIG. 5. In some embodiments, the road intersection 810 may be obtained based on the start location and the road intersection 810 has three exits (right exit 811, left exit 812, backward exit 813) corresponding to three directions (right, left, backward) respectively. For example, the left exit 812 of the road intersection is selected by the model. The road intersection 820 may then be considered as a subsequent road intersection after the road intersection 810 due to the selection of the left exit 812. For example, the model may select right exit 824 of the road intersection 820. Similarly, exit 832 and exit 843 may be selected from the exits of the road intersection 830 and 840 respectively. Since the exit 843 is in the same road segment as the destination, the determinations of entrances and exits finish and the exits 812, 824, 832 and 843 may be connected to generate a recommended route from the start location to the destination.

Figure 9:
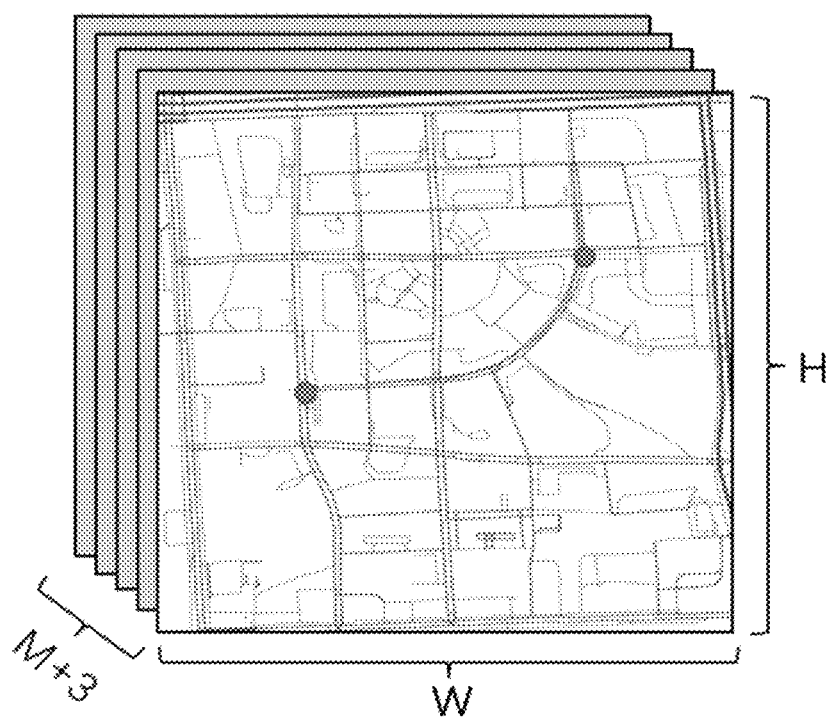
FIG. 9 illustrates a schematic diagram of an exemplary channel according to some embodiments of the present disclosure.

FIG. 9 illustrate a schematic diagram of exemplary channels of a model according to some embodiments of the present disclosure. In some embodiments, the model may be a convolutional neural network (CNN). In some embodiments, the channels may include RGB channels corresponding to the road map. The channels may also include channels corresponding to road characteristic information (also referred to as characteristic channels). Road characteristic information may be converted to a form of characteristic channels to be input to the model. The characteristic channels may help in the generation of the route from the start location to the destination. The characteristic information may include a traffic restriction, traffic lights, a traffic accident and/or a traffic congestion, grades of a road, or the like, or any combination thereof. Each type of characteristic information may correspond to a characteristic channel.

As shown in FIG. 9, there may be M+3 channels inputting into the model, wherein M is the number of the types of road characteristic information and 3 corresponds to the number of RGB channels. The number of pixel tensor of RGB channels may be expressed as:

$$\text{Pixel tensor}_{RGB} = W \cdot H \cdot 3 \quad (1),$$

wherein W denotes the width of the channels; and H denotes the height of the channels.

The total number of the pixel tensor of the model that includes both RGB channels and characteristic channels may be expressed as:

$$\text{Pixel tensor}_{Total} = W \cdot H \cdot (M+3) \quad (2).$$

wherein M denotes the number of different types of road characteristic information.

In some embodiments, a value of a pixel may relate to the M+3 tensors corresponding to the pixel. More particularly, the value of the pixel may be a weighted sum of the M+3 tensors. In some embodiments, the RGB channels may determine the objects (e.g., roads, buildings, rivers, etc.) in the road map and the tensors therein may have a high weight.

The tensors of a characteristic channel that determines whether locations (e.g. pixels in the road map) are traffic lights may have a low weight. The tensors of a characteristic channel that determines whether the traffic of the locations are restricted may have the highest weight (e.g., if a location is determined to be traffic restricted, the model may not select the road around it).

Figure 10:
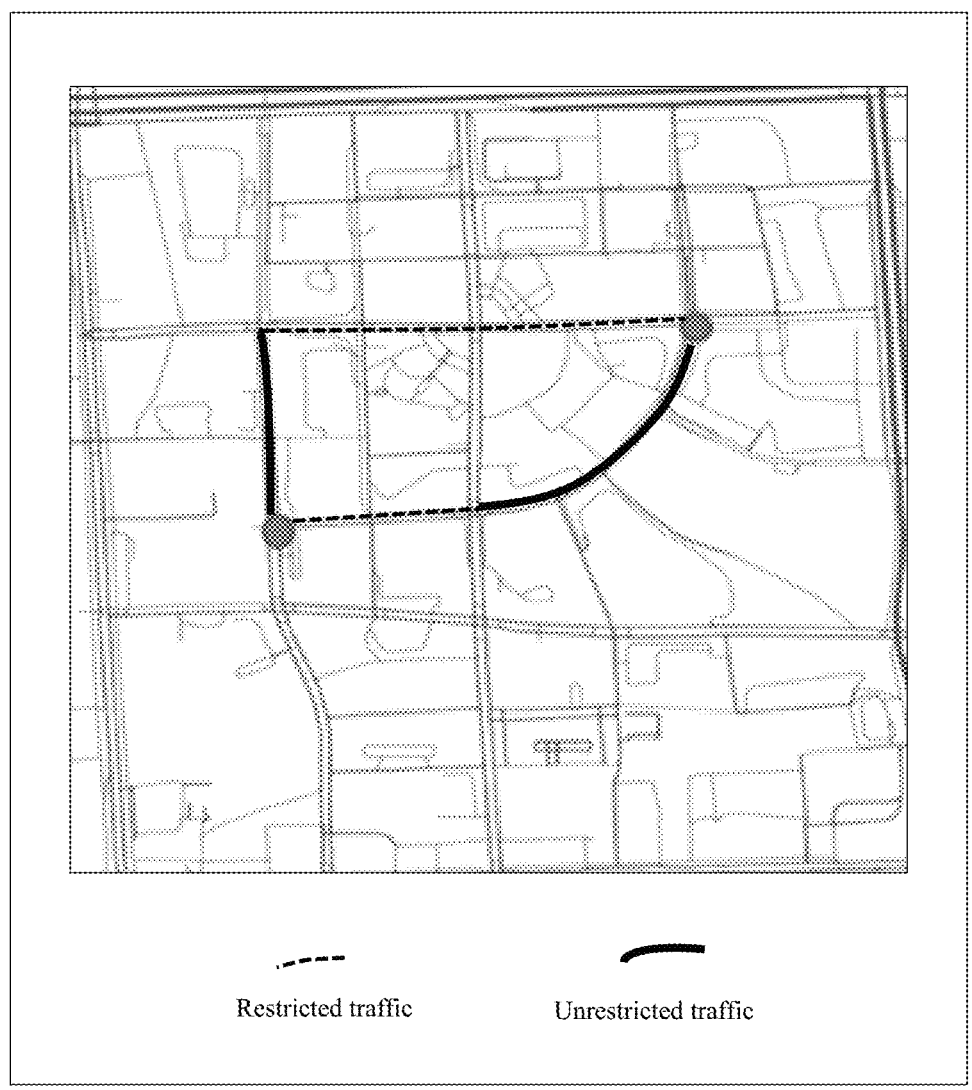
FIG. 10 illustrates a schematic diagram of an exemplary channel according to some embodiments of the present disclosure.

FIG. 10-FIG. 13 are schematic diagrams illustrating exemplary characteristic channels according to some embodiments of the present disclosure. As shown in FIG. 10, a traffic restriction may influence the route planning. There may exist restricted roads or unrestricted roads in a road map. The restricted road or unrestricted road may be determined based on traffic flow, traffic congestion, weather, etc. For example, in order to reduce the restricted road flow, a car which has an odd restricted road number in the last digit of its plate number may be restricted on Tuesday in a certain road. For another example, drivers from other towns may be restricted in rush hours in a certain road.

The characteristic channel of traffic restriction may correspond to a matrix with a size of W*H. Each element of the matrix may correspond to the value of a pixel in the characteristic channel. In some embodiments, the values of the elements in the matrix that correspond to a restricted road may be 0 and the values of the elements in the matrix that correspond to an unrestricted road may be 1.

Figure 11:
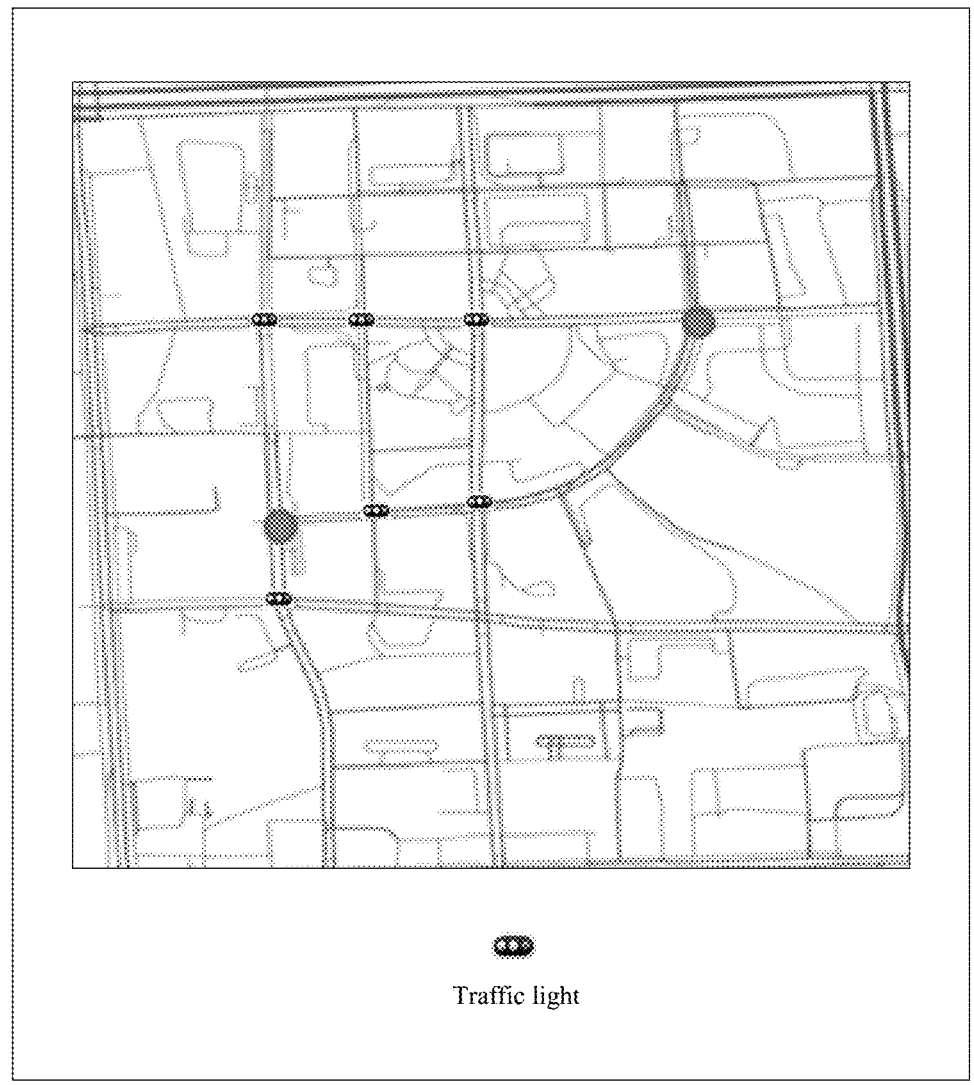
FIG. 11 illustrates a schematic diagram of an exemplary channel according to some embodiments of the present disclosure.

FIG. 11 is a schematic diagram illustrating an exemplary characteristic channel according to some embodiments of the present disclosure. As shown in FIG. 11, there may exist a plurality of traffic lights in the roads. The plurality of traffic lights may influence a route planning from a start location to a destination. The number and location of the traffic lights and the characteristics (e.g. the length of red or green light, etc.) of the traffic lights may be different in different routes from the start location to the destination and may affect the selection of the road intersection and/or routes. For example, a user and/or a model may prefer to select an exit that is green or has shorter waiting time of the red light. For another example, a user and/or a model may prefer to select a route that has a fewer total number of traffic lights.

The characteristic channel of traffic lights may correspond to a matrix with a size of W*H. Each element of the matrix may correspond to the value of a pixel in the characteristic channel. In some embodiments, the values of the elements in the matrix that correspond to traffic lights may be 0 and the values of the elements in the matrix that do not correspond to traffic light may be 1.

Figure 12:
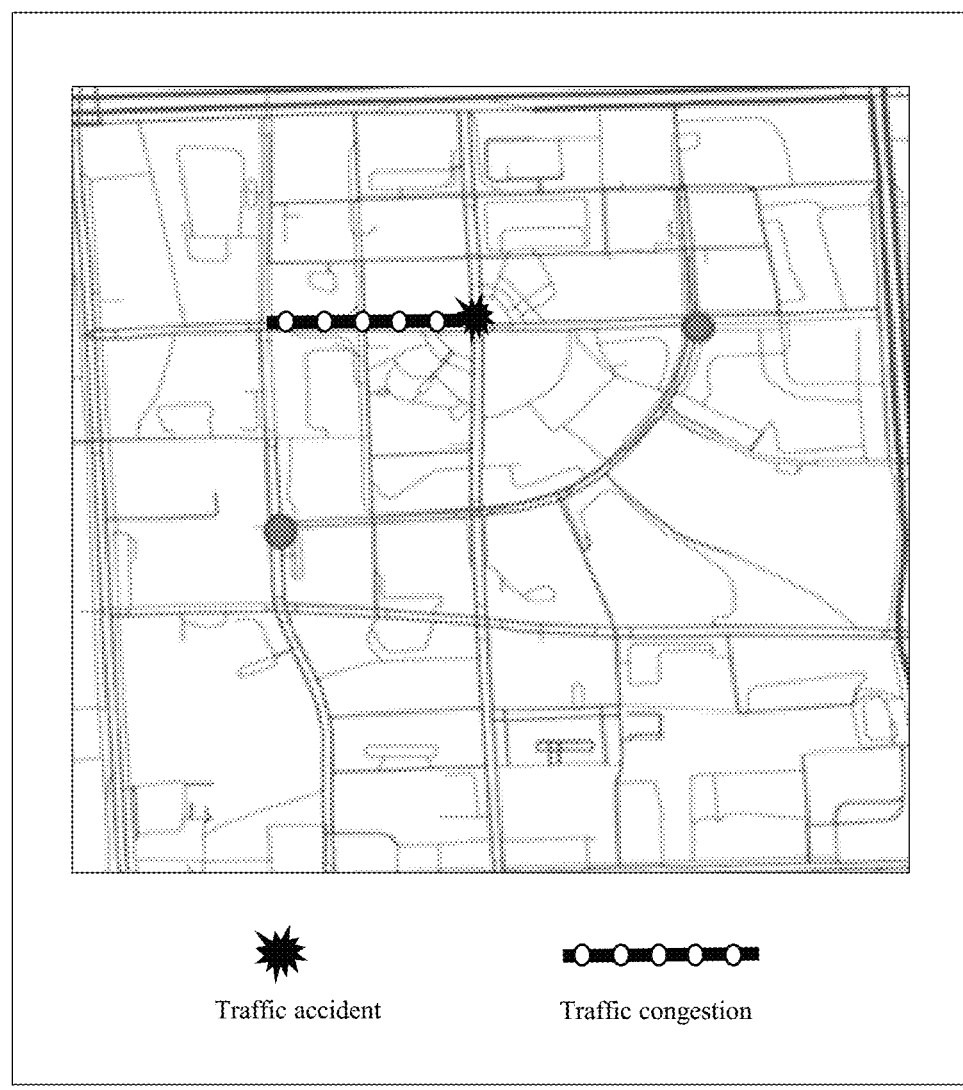
FIG. 12 illustrates a schematic diagram of an exemplary channel according to some embodiments of the present disclosure.

FIG. 12 is a schematic diagram illustrating an exemplary characteristic channel according to some embodiments of the present disclosure. As shown in FIG. 12, a traffic accident and/or a traffic congestion may influence a route planning from a start location to a destination. In some embodiments, the traffic accident and/or the traffic congestion may influence the selecting of exit in a road intersection. For example, a user and/or a model may prefer to select an expedite road than a road in traffic congestion.

The characteristic channel of traffic accident and/or a traffic congestion may correspond to a matrix with a size of W*H. Each element of the matrix may correspond to the value of a pixel in the characteristic channel. In some embodiments, the values of the elements in the matrix that correspond to traffic accident and/or a traffic congestion may be −1 and the values of the elements in the matrix that do not correspond to traffic accident and/or a traffic congestion may be 0.

Figure 13:
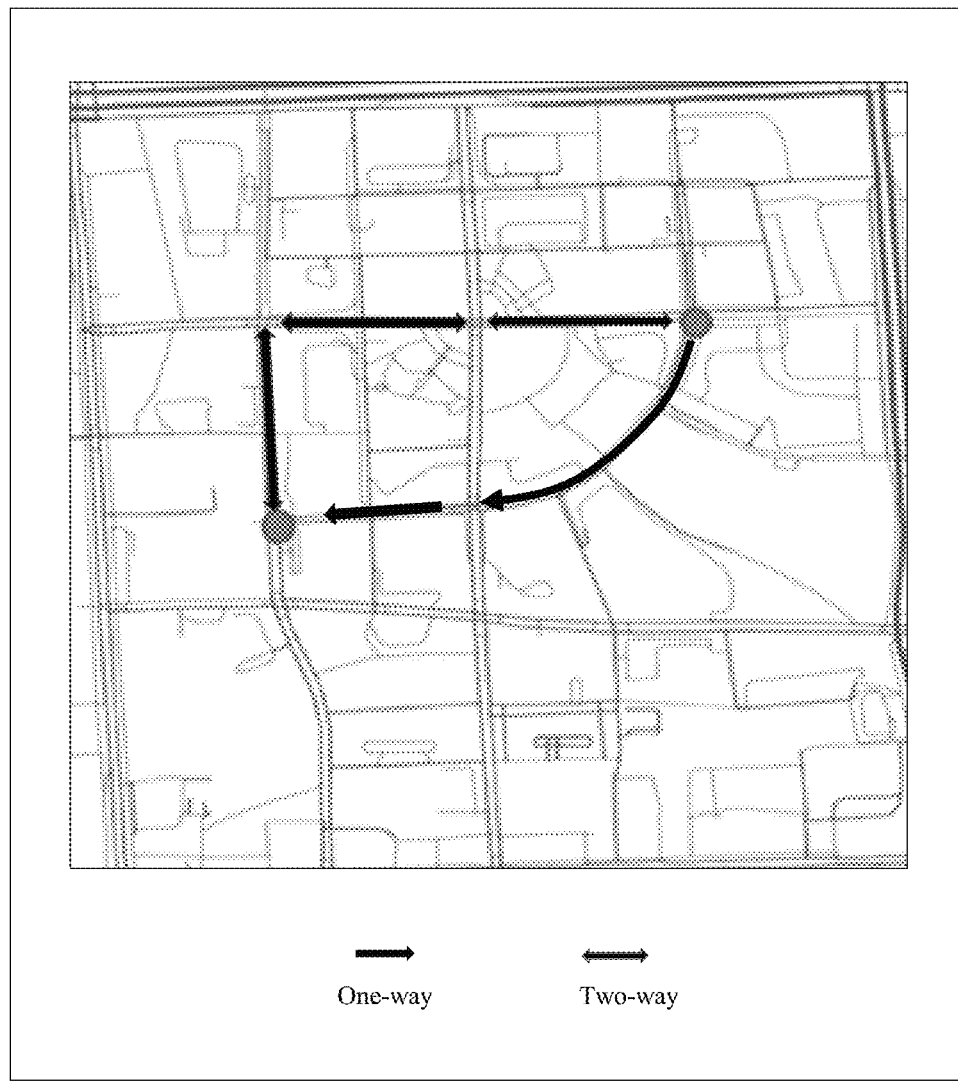
FIG. 13 illustrates a schematic diagram of an exemplary channel according to some embodiments of the present disclosure.

FIG. 13 is a schematic diagram illustrating an exemplary characteristic channel according to some embodiments of the present disclosure. As shown in FIG. 13, a one-way road and a two-way road may also affect route planning from a start location to a destination. For example, a one-way road may be selected only if the vehicle is in a correct direction.

The characteristic channel of one-way road and/or two-way road may correspond to a matrix with a size W*H. Each element of the matrix may correspond to the value of a pixel in the characteristic channel. In some embodiments, the values of the elements in the matrix that correspond to one-way road may be −1 in a reverse or illegal direction and +1 in a allowed direction, the values of elements in the matrix that do not correspond to a road may be 0 and the values of the elements in the matrix that correspond to a two-way road may be 1.

Figure 14:
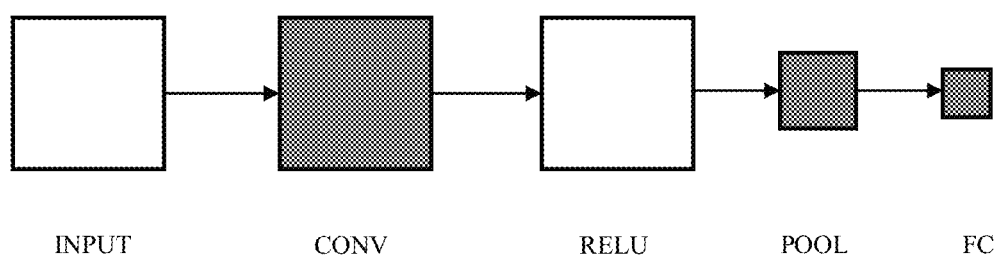
FIG. 14 illustrates a schematic diagram of an exemplary structure of a model according to some embodiments of the present disclosure.

FIG. 14 is a schematic diagram illustrating an exemplary structure of a model according to some embodiments of the present disclosure. In some embodiments, the model may be a convolutional neural network (CNN). The CNN may be a multilayer neural network (e.g., including multiple layers). The multiple layers may include at least one of a convolutional layer (CONV), a Rectified Linear Unit (ReLU) layer, a pooling layer (POOL), or a fully connected layer (FC). The multiple layers of CNN may correspond to neurons arranged in 3 dimensions: width, height, depth. In some embodiments, CNN may have an architecture as [INPUT-CONV-RELU-POOL-FC]. In some embodiments, The INPUT [32×32×3] may hold the raw pixel values of the image, in this case an image of width 32, height 32, and with three color channels R,G,B. The CONV layer may compute the output of neurons that are connected to local regions in the input, each computing a dot product between their weights and a small region they are connected to in the input volume. This may result in a volume of [32×32×12] if 12 filters are used. The CONV layer may be the core building block of CNN that does most of the computational load. The RELU layer may apply an elementwise activation function, such as the max (0, x) thresholding at zero. This may leave the size of the volume unchanged ([32×32×12]). The POOL layer may perform a downsampling operation along the spatial dimensions (width, height), resulting in a volume such as [16×16×12]. The function of the POOL layer may be to progressively reduce the spatial size of the representation to reduce the amount of parameters and computation in the network, and hence to also control overfitting. The Pooling Layer operates independently on every depth slice of the input and resizes it spatially, using the MAX operation. In some embodiments, the pooling layer with filters of size 2×2 applied with a stride of 2 downsamples. Each depth slice in the input by 2 along with both width and height, discarding 75% of the activations. Each MAX operation include taking a max over 4 numbers (e.g., little 2×2 region in some depth slice). The FC layer may compute the class scores, resulting in volume of size [1×1×10], where each of the 10 numbers correspond to a class score. Each neuron in the FC layer may be connected to all the values in the previous volume.

In this way, CNN may transform the original image layer by layer from the original pixel values to the final class scores. In particular, the CONV/FC layers perform transformations that may be a function of not only the activations in the input volume, but also of the parameters (for example, the weights and biases of the neurons). In some embodiments, the RELU/POOL layers may implement a fixed function. In some embodiments, the parameters in the CONV/FC layers may be trained with gradient descent so that the class scores that CNN computes may be consistent with the labels in the training set for each image.

The CNN may combine with reinforcement learning to improve the accuracy of the route planning. The reinforcement learning may include learning what to do, how to map situations to actions and to maximize a numerical reward signal. The reinforcement learning may include Markov Decision Process (MDP), Hidden Markov Model (HMM), etc.

Various aspects of methods of providing functions required by route planning and/or methods of implementing other steps by programs are described above. The programs of the technique may be considered as "products" or "artifacts" presented in the form of executable codes and/or relative data. The programs of the technique may be joined or implemented by the computer readable media. Tangible and non-volatile storage media may include any type of memory or storage that is applied in computer, processor, similar devices, or relative modules. For example, the tangible and non-volatile storage media may be various types of semiconductor storages, tape drives, disc drives, or similar devices capable of providing storage function to software at any time.

Some or all of the software may sometimes communicate via a network, e.g. Internet or other communication networks. This kind of communication may load a software from a computer device or a processor to another. For example, a software may be loaded from a management server or a main computer of server 105 to a hardware platform in a computer environment, or to other computer environments capable of implementing the system. Correspondingly, another media used to transmit software elements may be used as physical connections among some of the equipment, for example, light wave, electric wave, or electromagnetic wave may be transmitted by cables, optical cables or air. Physical media used to carry waves, e.g. cable, wireless connection, optical cable, or the like, may also be considered as media of hosting software. Herein, unless the tangible "storage" media is particularly designated, other terminologies representing the "readable media" of a computer or a machine may represent media joined by the processor when executing any instruction.

A computer readable media may include a variety of forms, including but is not limited to tangible storage media, wave-carrying media or physical transmission media. Stable storage media may include compact disc, magnetic disk, or storage systems that are applied in other computers or similar devices and may achieve all the sections of server 105 described in the drawings. Unstable storage media may include dynamic memory, e.g. the main memory of the computer platform. Tangible transmission media may include coaxial cable, copper cable and optical fiber, including circuits forming the bus in the internal of computing device 200. Wave-carrying media may transmit electric signals, electromagnetic signals, acoustic signals or light wave signals. And these signals may be generated by radio frequency communication or infrared data communication. General computer-readable media may include hard disk, floppy disk, magnetic tape, or any other magnetic media; CD-ROM, DVD, DVD-ROM, or any other optical media; punched cards, or any other physical storage media containing aperture mode; RAM, PROM, EPROM, FLASH-EPROM, or any other memory chip or magnetic tape; carrying waves used to transmit data or instructions, cable or connection devices used to transmit carrying waves, or any other program code and/or data accessible to a computer. Most of the computer readable media may be applied in executing instructions or transmitting one or more results by the processor.

It may be understood to those skilled in the art that various alterations and improvements may be achieved according to some embodiments of the present disclosure. For example, the modules of server 105 described above are all achieved by hardware equipment. All applications, modifications and alterations required to be protected in the claims may be within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
    at least one storage medium including a set of instructions for route planning; and
    at least one processor in communication with the at least one storage medium, wherein when executing the set of instructions, the at least one processor is directed to:
        receive a connection request from a user device of a service requester via a communication port of the system;
        accept the connection request to establish a connection with the user device;
        detect a route planning application executing on the user device, the service requesting application on the user device automatically communicating with the system over a network;
        communicate with the route planning application executing on the user device via the communication port to receive a start location and a destination;
        operate logic circuits in the at least one processor to receive road characteristic information associated with roads in a road map related to the start location and the destination;
        operate logic circuits in the at least one processor to execute a trained model to sequentially determine a series of road intersections under a sequence; and
        operate logic circuits in the at least one processor to execute the trained model to sequentially determine a target entrance and a target exit of each road intersection of the series of road intersections, and a recommended route from the start location to the destination based on the target entrances and target exits of the series of road intersections,
    wherein the trained model includes at least one of a convolutional neural network (CNN), the road map includes a three-channel RGB map layer as an input of the CNN, and the road characteristic information includes additional channels of map layers as the input of the CNN.

2. The system of claim 1, wherein the recommended route is determined by connecting the start location and the destination through the target entrance and the target exit of each road intersection of the series of road intersections under the sequence.

3. The system of claim 1, wherein the trained model includes at least one of a convolutional layer, a Rectified Linear Unit (ReLU) layer, a fully connected layer or a pooling layer.

4. The system of claim 1, wherein the at least one processor is further directed to:
    operate logic circuits in the at least one processor to receive a plurality of historical routes;
    operate logic circuits in the at least one processor to train a model based on the plurality of historical routes to generate the trained model; and
    generate the recommended route from the start location to the destination based on the trained model and the road characteristic information.

5. The system of claim 4, wherein the road characteristic information includes information of at least one of road grades, road lengths, road width, curve radius, speed limit, traffic restriction, traffic lights, traffic accident, or traffic congestion.

6. The system of claim 4, wherein the at least one processor is further directed to:
    operate logic circuits in the at least one processor to select a plurality of target routes from the plurality of historical routes; and
    operate logic circuits in the at least one processor to generate the route from the start location to the destination based on the road characteristic information and the plurality of target routes.

7. The system of claim 6, wherein a start location or a destination of each of the plurality of target routes is the same as or similar to the start location or the destination received by the at least one processor.

8. The system of claim 6, wherein to select the plurality of target routes the at least one processor is further directed to:
    operate logic circuits in the at least one processor to determine the quality of each of the plurality of historical routes; and
    operate logic circuits in the at least one processor to select some of the plurality of historical routes as the target routes based on the quality of the plurality of historical routes.

9. The system of claim 8, wherein the quality of each of the plurality of historical routes is determined based on at least one of distance, Estimated Time of Arrival (ETA), degree of safeness, traffic conditions, road types, or sceneries along the route.

10. A method implemented on a computing device having at least one storage device storing a set of instructions for route planning, and at least one processor in communication with the at least one storage device, the method comprising:
   establishing, by the computing device, a connection with a user device of a service requester;
   receiving, by the at least one processor, a start location and a destination via the connection;
   receiving, by the at least one processor, road characteristic information associated with roads in a road map related to the start location and the destination;
   executing, by the at least one processor, a trained model to sequentially determine a series of road intersections under a sequence; and
   executing, by the at least one processor, the trained model to sequentially determine
      a target entrance and a target exit of each road intersection of the series of road intersections, and
      a recommended route from the start location to the destination based on the target entrances and target exits of the series of road intersections,
   wherein the trained model includes at least one of a convolutional neural network (CNN), the road map includes a three-channel RGB map layer as an input of the CNN, and the road characteristic information includes additional channels of map layers as the input of the CNN.

11. The method of claim 10, wherein the recommended route is determined by connecting the start location and the destination through the target entrance and the target exit of each road intersection of the series of road intersections under the sequence.

12. The method of claim 10, wherein the trained model includes at least one of a convolutional layer, a Rectified Linear Unit (ReLU) layer, a fully connected layer or a pooling layer.

13. The method of claim 10, further comprising:
   receiving, by the at least one processor, structured data encoding a plurality of historical routes;
   training, by the at least one processor, a model based on the plurality of historical routes to generate a trained model; and
   generating, by the at least one processor, the recommended route from the start location to the destination based on the trained model and the road characteristic information.

14. The method of claim 13, wherein the road characteristic information includes information of at least one of road grades, road lengths, road width, curve radius, speed limit, traffic restriction, traffic lights, traffic accident, or traffic congestion.

15. The method of claim 13, further comprising:
   selecting, by the at least one processor, a plurality of target routes from the plurality of historical routes; and
   generating, by the at least one processor, the route from the start location to the destination based on the road characteristic information and the plurality of target routes.

16. The method of claim 15, wherein a start location or a destination of each of the plurality of target routes is the same as or similar to the start location or the destination received by the at least one processor.

17. The method of claim 15, wherein the selecting the plurality of target routes includes:
   determining, by the at least one processor, the quality of each of the plurality of historical routes; and
   selecting, by the at least one processor, some of the plurality of historical routes as the target routes based on the quality of the plurality of historical routes.

18. A non-transitory computer readable medium, comprising executable instructions for route planning that, when executed by at least one processor of an electronic device, directs the at least one processor to perform actions of:
   establishing, by the electronic device, a connection with a user device of a service requester;
   receiving, by the at least one processor, a start location and a destination, via the connection;
   receiving, by the at least one processor, road characteristic information associated with roads in a road map related to the start location and the destination;
   executing, by the at least one processor, a trained model to sequentially determine a series of road intersections under a sequence; and
   executing, by the at least one processor, the trained model to sequentially determine
      a target entrance and a target exit of each road intersection of the series of road intersections, and
      a recommended route from the start location to the destination based on the target entrances and target exits of the series of road intersections,
   wherein the trained model includes at least one of a convolutional neural network (CNN), the road map includes a three-channel RGB map layer as an input of the CNN, and the road characteristic information includes additional channels of map layers as the input of the CNN.

* * * * *